United States Patent Office 3,538,038
Patented Nov. 3, 1970

3,538,038
NON-CELLULAR POLYURETHANES AND METHOD FOR PREPARATION WITH ACTIVATED ALUMINA
Bernard Blanc and Gerard Repiquet, Martigues, and Camille Granger, Lavera, France, assignors to Naphtachimie, Paris, France
No Drawing. Filed Nov. 9, 1966, Ser. No. 592,994
Claims priority, application France, Nov. 24, 1965, 39,621
Int. Cl. C08g *51/04, 53/00*
U.S. Cl. 260—37  5 Claims

ABSTRACT OF THE DISCLOSURE

The preparation of a non-cellular polyurethane formed by reaction of organic polyisocyanates and polyhydroxy compounds, with or without fillers, pigments and other adjuvants, in which activated alumina particles having a surface area greater than 300 square meters per gram, a size between 1–200 microns and an $Na_2O$ content of less than 2000 parts per million are incorporated with the polyhydroxy compounds or fillers before combination with the polyisocyanates.

---

This invention relates to non-cellular polyurethanes, such as molding resins, cements, coatings, paints and varnishes, and more particularly to the method for the manufacture of same in which the water contained in the constituents has been fixed in a manner such that the water cannot react with the functional isocyanate groups.

It is known to prepare non-cellular polyurethanes starting with organic polyisocyanates and polyhydroxy compounds with which certain additives can be mixed, such as fillers and pigments. In the course of the preparation, the water contained in the starting materials reacts with the polyisocyanate with the evolution of carbon dioxide. The gases evolved cause the formation of bubbles in the interior of the mass thereby to create discontinuities which are prejudicial to its appearance and to the mechanical and chemical properties of the product.

In order to eliminate the moisture introduced with the fillers and the pigments, they have been subjected to preliminary grinding in the presence of isocyanates. This procedure has the disadvantage of embodying the use of isocyanates, which are expensive materials, and it brings about a pressure rise within the grinder due to the evolution of carbon dioxide.

It is also known to mix the constituents containing water with certain easily hydrolyzable compounds such as alkyl borates, aluminum alkoxides, or alkyl titanates, which react with the water to yield hydrolysis products having groups capable of reaction with isocyanates but without evolution of gas. This procedure is uneconomical because it involves consumption of the hydrolyzable product and of isocyanates.

Another procedure, described in the French Pat. No. 1,321,178, consists of employing a molecular sieve, such as an alkaline alumino-silicate having a zeolite structure. These substances have the ability to absorb water contained in the components and to maintain the water so that it is no longer available for reaction with the isocyanates. These molecular sieves are very expensive and they undesirably affect the cost of the polyurethanes.

As described in the same French patent, attempts have been made to utilize other absorbents, such as silica gel and activated alumina. However, to the present, it has not been possible to obtain results of value.

It is an object of this invention to provide an economical process for making polyurethanes which do not contain bubbles in the interior of the reticulated mass and it is a related object to produce new and improved polyurethanes thereby.

It has been found that certain types of low cost activated alumina can be used to fix water contained in the starting materials employed in the preparation of the polyurethanes so that the water is no longer available to react with the isocyanates.

The process consists in reacting organic polyisocyanates with polyhydroxy compounds, with or without fillers, pigments and various adjuvants, and in which a water fixation agent is incorporated in the form of an activated and finely divided alumina having a surface area greater than 300 square meters per gram and in which the diameter of the particles is within the range of 1 to 200 microns and in which the soda content is less than 200 parts per million by weight.

The activated alumina should have a large surface area in the order of at least 300 square meters per gram. If the activated alumina has a surface area below this value, it is incapable of the fixation of water in a satisfactory manner. The diameter of the particles of alumina is also important. When the diameter of the particles is below 1 micron, the incorporation of the alumina in the polyhydroxy compound with added fillers and pigment introduces an exaggerated increase in the viscosity of the mixture and makes it more difficult to use. When the diameter of the particles of alumina is greater than 200 microns, the discontinuities formed in the polyurethane are too large.

In certain applications, such as in the preparation of varnishes, it is preferred to make use of alumina particles in which the diameter is less than 20 microns, especially when it is desirable to achieve a coating having good surface homogeneity.

In addition, since the soda has a catalytic effect on the formation reaction of urethanes, the activated alumina should have a very low soda content of below 2000 parts per million by weight.

Activated alumina which can be employed in the practice of this invention can be illustrated by gels of pseudo-boehmite which has been calcined and ground or activated hydrargillites, such as those obtained according to the procedure described in French Pat. No. 1,108,-011, filed June 28, 1954 (now Pat. No. 2,915,365) and subsequently treated to eliminate soda and to a grinding and reactivation treatment.

The amount of activated alumina employed will depend somewhat upon the amount of water to be absorbed and can be estimated to correspond to about thirty times the weight of water contained in the starting materials.

In use, the activated alumina can be introduced with agitation to the polyhydroxy compounds, such as polyesters or polyol polyethers, with or without the added fillers, pigments or other additives, before the addition of the isocyanate.

Cements, molding resins or varnishes can be obtained which are relatively free of bubbles. Varnishes can be prepared which set by reaction with the humidity in the air and they can be packaged to be perfectly stable in storage.

The following examples are given by way of illustration, but not by way of limitation, of the practice of this invention:

EXAMPLE 1

Preparation of a solventless coating by a two-pot procedure:

First pot 41.5 parts by weight propoxylated sorbitol having a molecular weight of 1200 (0.1% by weight of water)
12.7 parts by weight titanium oxide (dutile) (0.7% by weight of water)

1.9 parts by weight yellow pigment (9.5% by weight of water)

The foregoing materials are combined and ground together. Addition is made with agitation of 5 parts by weight of activated hydrargillite from which the soda has been removed, ground and reactivated and which has the following characteristics:

diameter of the particles, between 1 and 10 microns
surface area, 341 square meters per gram
absorption of water in a 60% relative humidity atmosphere, 20 cubic centimeters per 100 grams of alumina
$Na_2O$ content: 1000 parts per million by weight Second pot 29.1 parts by weight crude diphenyl methane—4,4'-diisocyanate is placed in the second pot This coating composition will keep practically indefinitely as long as the contents of the two pots are not mixed. Upon mixture of the contents of the two pots, a composition is obtained capable of providing an excellent floor covering coating which is very resistant to abrasion and which does not have bubbles. No evolution of gas or increase in volume occurs when the coating is allowed to solidify.

When a coating is prepared of the same components, employed in the same proportions, but without the addition of activated hydrargillite, an evolution of gas and an increase in volume is observed after mixture of the two materials in the two vessels.

EXAMPLE 2

Another solventless coating is prepared by following the two-pot procedure. The first pot is identical with that of Example 1. The second pot contains 28.2 parts by weight of crude polymethylene polyphenyl isocyanate (PAPI). When the contents of the two pots are mixed and applied as a coating, a coating is obtained which is substantially identical to that obtained by Example 1.

EXAMPLE 3

Composition hardenable by the moisture in air

The following constituents were mixed and ground:

37.2 parts by weight of a condensate of polypropylene oxide and glycerine having a molecular weight of 750 and containing 0.1% by weight of water
18.8 parts by weight toluene
18.8 parts by weight anhydrous acetate of ethylene glycol
49.0 parts by weight of titanium oxide (rutile) containing 0.7% by weight of water
2.0 parts by weight red azo dye containing 0.4% by weight of water 14.0 parts by weight of activated hydrargillite, as in Example 1, is incorporated with agitation into the ground product.

The mixture is packaged under a nitrogen atmosphere and addition is made with agitation of 25.2 parts by weight of toluene diisocyanate comprising a mixture of 2,4 and 2,6 isomers in the proportion of 80/20. While still under a nitrogen atmosphere and with continued agitation, the product is gradually heated to a temperature of about 75° C. and held for three hours.

A paint composition is obtained which hardens under the action of humidity in the air but which remains stable during storage in a single container notwithstanding the presence of an azo dye which can function as a catalyst in the reaction of the isocyanates and water.

The same results are obtained when the activated hydrargillite is replaced with the same amount of calcined and ground pseudo-boehmite having the following characteristics:

diameter of the particles, between 1 and 10 microns
surface area, 350 square meters per gram
absorption of water in a 60% relative humidity atmosphere, 21.8 cubic centimeters per 100 grams
$Na_2O$ content: 400 parts per million by weight When a paint is prepared with the same components, but without activated alumina, the setting of the product into a mass occurs during the course of its preparation.

EXAMPLE 4

Preparation of a molding resin

The following materials are introduced with mixing into a container provided with an agitator:

50 parts by weight of the condensate of propylene oxide and sorbitol having a molecular weight of 800 and containing 0.1% by weight of water
50 parts by weight of the condensate of propylene oxide and glycerine having a molecular weight of 700 and containing 0.1% by weight of water
3.5 parts by weight of activated hydrargillite of Example 1

Mixing is continued for one hour and then 50 parts by weight of the mixture of 2,4 and 2,6 isomers of toluene diisocyanate in the proportion of 80/20 are added with continued agitation.

When a homogeneous mixture is obtained, it is cast into a mold and baked at 140° for six hours. A hard molded resinous product, free of bubbles, is obtained.

When the test is carried out with the same materials, in the same amounts, but without activated alumina, a molded resinous product is obtained having a large number of bubbles which impair its appearance and its mechanical properties.

EXAMPLE 5

Preparation of cement by a two-pack procedure

*First pack.*—The following materials are combined with mixing:

37.2 parts by weight condensate of propylene oxide and propylene glycol having a molecular weight of 2050 and containing 0.1% by weight of water
74.5 parts by weight of talc containing 0.4% by weight of water
17.7 parts by weight of zinc white containing 0.5% by weight of water
0.4 part by weight of di-n-butyl tin dilaurate
14.7 parts by weight of activated hydrargillite in which the particles have a diameter of 50–200 microns, a surface area of 340 square meters per gram and an $Na_2O$ content of 1000 parts per million

*Second pack.*—The composition in the second pack consists of 55.5 parts by weight of the prepolymer obtained by reaction of toluene diisocyanate and the polyether having a molecular weight of 3000 and obtained by condensation reaction of propylene oxide and glycerine and in which the amount of isocyanate is equal to twice the theoretical amount necessary to obtain a stoichiometric reaction with the terminal hydroxyl groups of the polyether.

To provide the cement, the contents of the two packs are mixed immediately before use. The mass sets after several hours at ordinary temperature to produce a solid cement having interesting elastic properties which permit excellent sealed joints to be obtained.

When the experiment is repeated with the same materials, in the same amounts, but without activated alumina, the cement swells during its setting into a mass by reason of the evolution of carbon dioxide.

It will be apparent from the foregoing that we have provided a new and improved polyurethane system and composition which is capable of use in the manufacture of products having improved mechanical and physical properties and which are relatively free of bubbles.

It will be understood that changes may be made in the details of formulation and method of operation with-

We claim:
1. In the process for the preparation of polyurethanes formed by the reaction of organic polyisocyanates and polyhydroxy compounds, with or without the addition of fillers, pigments and other adjuvants, the improvement consisting of incorporating into said polhydroxy compounds a water fixing agent in the form of activated alumina particles having a surface area greater than 300 square meters per gram, a size between 1–200 microns and an $Na_2O$ content of less than 2000 parts per million whereby a polyurethane product is secured which is substantially non-cellular and reacting the organic polyisocyanate and polyhydroxy compound without removal of the activated alumina, and in which the activated alumina is added to the starting materials in the absence of the isocyanate and the isocyanate is afterwards added to the mixture for reaction to form the hardenable resinous composition.

2. The process as claimed in claim 1 in which the amount of activated alumina corresponds to about thirty times the weight of free water in the starting materials.

3. The process as claimed in claim 1 in which a hardenable coating composition is produced in which all but the isocyanate are embodied in one mixture and the isocyanate is kept separate and apart from the mixture and the two are mixed together immediately prior to coating to form the coating composition.

4. The process as claimed in claim 1 for producing a hardenable cement in which all but the isocyanate are embodied in one mixture and the isocyanate is kept separate and apart therefrom and the two are mixed together immediately prior to use as a cement.

5. A non-cellular polyurethane produced by the method of claim 1 in which the free water in the starting materials has been fixed to prevent reaction with isocyanate for release of carbon dioxide.

References Cited
UNITED STATES PATENTS

| | | | |
|---|---|---|---|
| 2,902,388 | 9/1959 | Szukiewicz | 117—70 |
| 3,354,099 | 11/1967 | Stegemann | 260—2.5 |
| 3,154,521 | 10/1964 | Terek et al. | 260—75 |

FOREIGN PATENTS

| | | |
|---|---|---|
| 1,046,362 | 10/1966 | Great Britain. |
| 1,152,623 | 2/1958 | France. |
| 1,446,658 | 6/1966 | France. |

OTHER REFERENCES

Neddenriep-Molecular Sieves: Adhesives Age, June 1966, pp. 23–29.

Kirk-Othma-Encyclopedia of Chemical Technology, vol. 2, pp. 48–53; vol. 7, pp. 391–394; First Supplement, pp. 441–442. Call No. TP9E68 (1963).

HOSEA E. TAYLOR, Primary Examiner

H. S. COCKERAM, Assistant Examiner

U.S. Cl. X.R.

260—77.5